United States Patent
Nanami

(10) Patent No.: US 8,466,827 B2
(45) Date of Patent: Jun. 18, 2013

(54) OBJECT DETECTING DEVICE

(75) Inventor: Takeshi Nanami, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 139 days.

(21) Appl. No.: 12/988,941

(22) PCT Filed: Sep. 1, 2009

(86) PCT No.: PCT/JP2009/065251
§ 371 (c)(1),
(2), (4) Date: Oct. 21, 2010

(87) PCT Pub. No.: WO2010/026959
PCT Pub. Date: Mar. 11, 2010

(65) Prior Publication Data
US 2011/0050482 A1    Mar. 3, 2011

(30) Foreign Application Priority Data
Sep. 5, 2008   (JP) ................ 2008-228812

(51) Int. Cl.
   *G01S 13/86*   (2006.01)
   *G01S 13/93*   (2006.01)

(52) U.S. Cl.
   USPC ............................. 342/70; 342/52

(58) Field of Classification Search
   USPC ..................................... 342/70–72
   See application file for complete search history.

(56) References Cited

U.S. PATENT DOCUMENTS

| | | | |
|---|---|---|---|
| 6,999,896 B2 * | 2/2006 | Takahashi | 702/181 |
| 7,176,830 B2 * | 2/2007 | Horibe | 342/70 |
| 7,501,980 B2 * | 3/2009 | Focke et al. | 342/174 |
| 7,706,978 B2 * | 4/2010 | Schiffmann et al. | 701/301 |
| 2004/0098224 A1 | 5/2004 | Takahashi | |
| 2004/0178945 A1 * | 9/2004 | Buchanan | 342/70 |
| 2006/0091654 A1 * | 5/2006 | De Mersseman et al. | 280/735 |
| 2007/0057837 A1 * | 3/2007 | Huizing et al. | 342/52 |
| 2007/0165967 A1 * | 7/2007 | Ando et al. | 382/291 |
| 2008/0024607 A1 * | 1/2008 | Ozaki | 348/148 |
| 2009/0067670 A1 * | 3/2009 | Johnson et al. | 382/100 |

FOREIGN PATENT DOCUMENTS

| | | | |
|---|---|---|---|
| JP | 2005-141517 A | 6/2005 | |
| JP | 2006-151125 A | 6/2006 | |
| JP | 2006-293835 A | 10/2006 | |
| JP | 2007-163258 A | 6/2007 | |
| JP | 2007-240208 A | 9/2007 | |

OTHER PUBLICATIONS

Translation of International Preliminary Report on Patentability dated Apr. 12, 2011.

* cited by examiner

*Primary Examiner* — Matthew M Barker
(74) *Attorney, Agent, or Firm* — Kenyon & Kenyon LLP

(57) ABSTRACT

An object detecting device which can reduce the influence of an error caused by temporal displacement between a detection result by a radar and a detection result by image processing and thus, the precision of object detection can be improved. In one particular embodiment, the device may receive image data captured by a camera and radar data from a radar unit. The device searches the image data for the target object, and also extracts detection points from the radar data that correspond to the target object. The position of the target object in the image is corrected in accordance with the radar detection data.

5 Claims, 5 Drawing Sheets

Fig.4
(a)
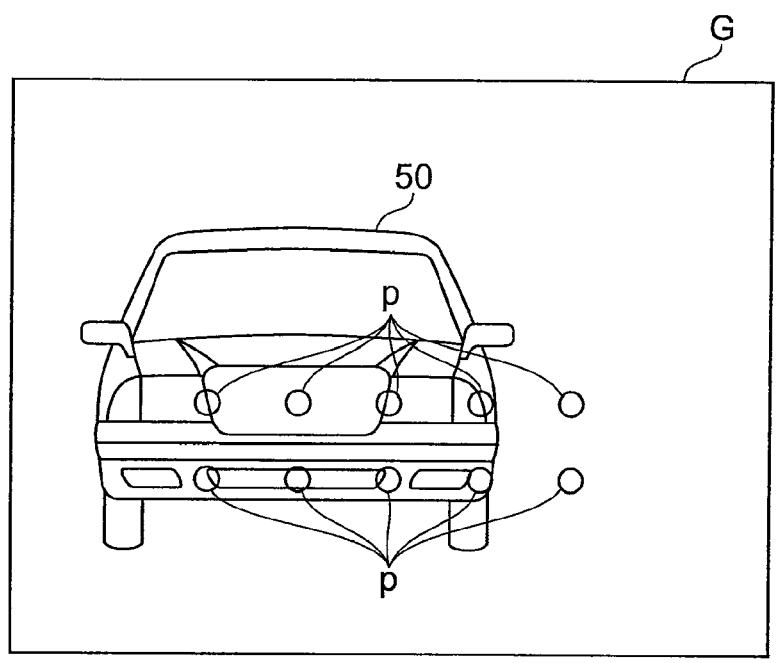
(b)
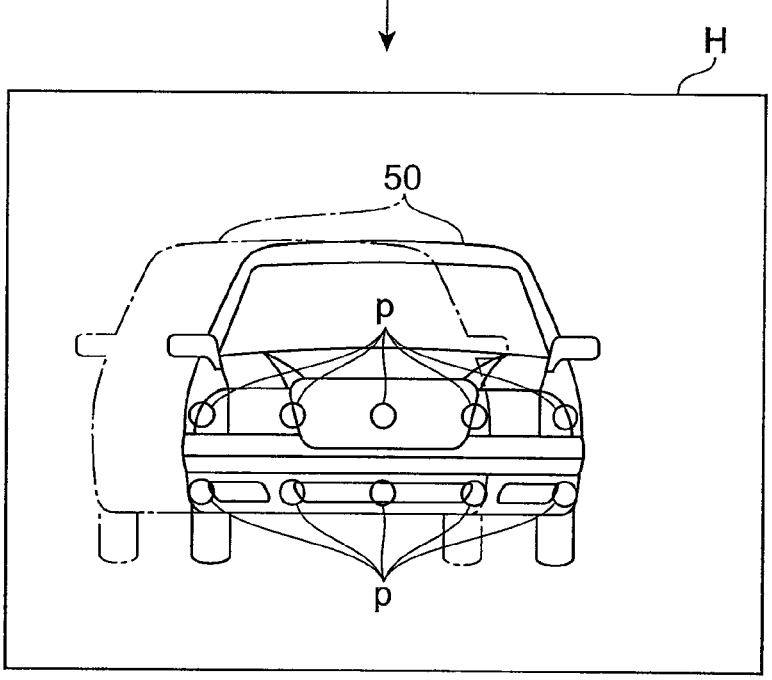

*Fig.5*
(a)
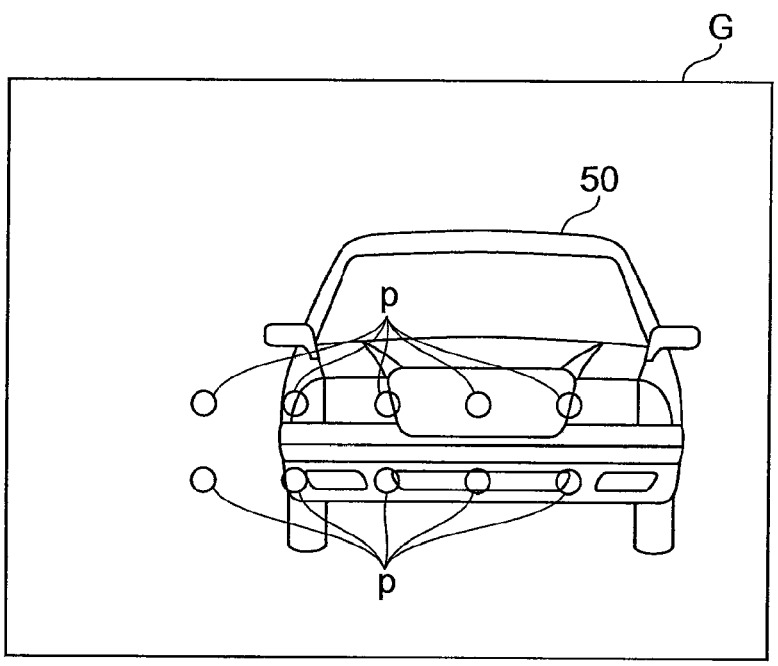
(b)
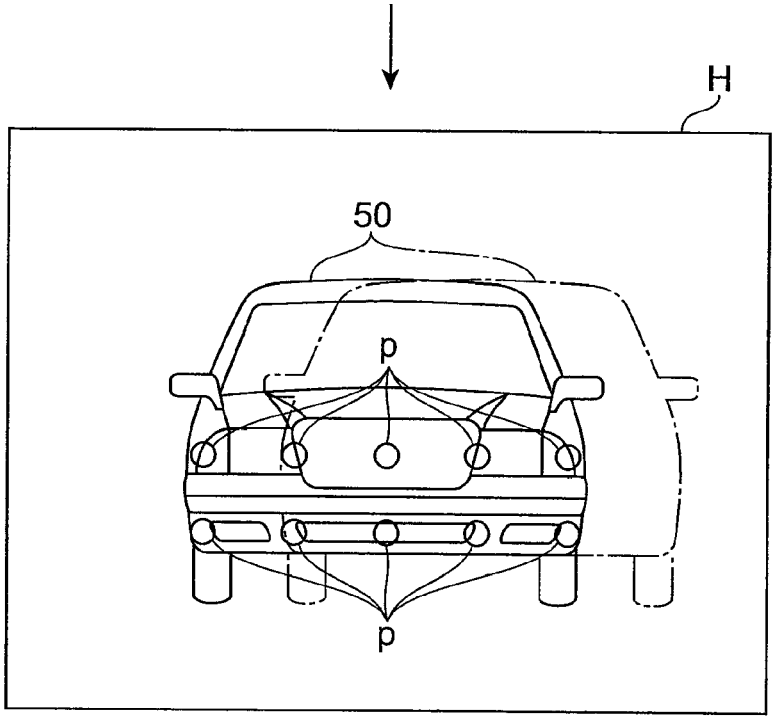

OBJECT DETECTING DEVICE

This is a 371 national phase application of PCT/JP2009/065251 filed 1 Sep. 2009, claiming priority to Japanese Patent Application No. JP 2008-228812 filed 5 Sep. 2008, the contents of which are incorporated herein by reference.

TECHNICAL FIELD

The present invention relates to an object detecting device which detects an object based on a detection result by a radar and an image captured by an image capture device.

BACKGROUND ART

In a conventional vehicle anti-collision system, an object detecting device which detects positions of other vehicles has been employed to avoid collision with another vehicle such as a preceding vehicle or an oncoming vehicle. As such an object detecting device, there is a device which detects an object by recognition processing of sensor fusion where a detection result by a radar is combined with an image captured by a camera.

Although the width of a target object to be detected cannot be calculated in principle by a radar, information of the distance to the object can be acquired. On the other hand, although the distance to the target object cannot be acquired by a monocular camera, the width of the object can be detected. Sensor fusion is a method which combines the functions of a plurality of sensors to detect an object. Detecting an object by using sensor fusion has been considered in various ways.

For example, patent literature 1 describes a method of processing an image captured by a camera through the use of the detection result by a radar to recognize and detect preceding vehicles and the like from the distance measured by the radar and vehicle characteristic quantity (car width, etc.) acquired by the image processing.

CITATION LIST

Patent Literature

Patent Literature 1: Japanese Patent Laid-Open No. 2005-141517

SUMMARY OF INVENTION

Technical Problem

Meanwhile, with object detection by sensor fusion as described above, the acquisition of a result of image processing requires more time than the acquisition of a detection result by a radar alone, because image data is processed through the use of the detection result by the radar. Therefore, with the conventional sensor fusion technology, there has been a problem that the position of the object recognized by image processing is displaced relative to the actual object position due to a time delay of the detection result by the image processing.

Having been conceived in view of the above circumstances, the present invention is directed to provide an object detecting device capable of reducing the displacement of the object position recognized by image processing, and improving the precision of object detection.

Solution to Problem

In order to achieve the above purpose, an object detecting device according to the present invention comprises: an image capture unit which captures images within a predetermined range and acquires image data; a radar detecting unit which irradiates an object with electromagnetic waves in a plurality of different directions within the predetermined range and acquires, for each of the irradiation directions of the electromagnetic waves, detection point data including data of the distance to an object existing in the direction; and an object detecting unit which detects a predetermined target object, based on the image data captured by the image capture unit and the detection point data detected by the radar detecting unit, wherein the object detecting unit comprises an image portion search means which searches the image data captured by the image capture unit, referring to the detection point data detected by the radar detecting unit, and detects an image portion corresponding to the target object; a detection point extracting means which extracts, from the detection point data detected by the radar detecting unit, detection point data corresponding to the target object, and an image portion correcting means which corrects, in accordance with the detection point data extracted by the detection point extracting means, the position of the image portion detected by the image portion search means.

According to the object detecting device of the above configuration, the image capture unit acquires the image data of images captured within a predetermined range, and the radar detecting unit acquires the detection point data for a plurality of different directions within that range. Subsequently, the object detecting unit corrects the position of an image portion corresponding to the target object by processing the image data and the detection point data. In the processing of the object detecting unit, a processing is performed to search the image data captured by the image capture unit and detect an image portion corresponding to the target object. Additionally, a processing is performed to extract, from a plurality of detection point data detected by the radar detecting unit, detection point data corresponding to the target object. Next, a processing is performed to correct, in accordance with the extracted detection point data, the position of the image portion. Because the position of the image portion corresponding to the target object is corrected by the series of processing mentioned above, displacement of the position of the object recognized by the image processing is reduced and thus, the precision of object detection can be improved.

In the above-mentioned object detecting device, it is preferred that the image portion correcting means corrects the position of the image portion so that the end of the image portion fits the end of the region comprising the detection point data extracted by the detection point extracting means. With this arrangement, since the position of the image portion is corrected so that the end of the image portion fits the end of the region comprising the detection point data corresponding to the target object, the position of the image portion corresponding to the target object can be corrected with a high precision, whereby the precision of object detection can be improved.

In the above-mentioned object detecting device, it is preferred that the image portion correcting means corrects the position of the image portion when the detection point data extracted by the detection point extracting means exists outside the image portion. With this arrangement, since the position of an image portion having an error can be corrected by correcting the position of the image portion when the detection point data corresponding to the target object exists outside the image portion, the precision of object detection can be improved.

In the above-mentioned object detecting device, it is preferred that the detection point data for use in the image portion correcting means is the detection point data detected after the image data for use in the image portion search means has been captured. With this arrangement, since the position of the image portion is corrected by using the detection point data detected after the image data has been captured and thus the image portion searched from old image data is corrected based on new detection data, the precision of object detection can be improved.

In the above-mentioned object detecting device, it is preferred that the object detecting unit further comprises an object information calculating means which calculates information relating to the target object from the detection point data extracted by the detection point extracting means and the image portion whose position has been corrected by the image portion correcting means. With this arrangement, since a process of calculating information relating to the target object is performed based on the detection point data corresponding to the target object and the image portion whose position has been corrected, the precision of detecting the target object can be improved.

In the above-mentioned object detecting device, it is preferred that the target object is a vehicle. According to this arrangement, detection precision of a vehicle located around a position where the object detecting device has been installed can be improved.

Advantageous Effects of Invention

According to the object detecting device of the present invention, displacement of the position of the object recognized by image processing is reduced, and thus the precision of object detection can be improved.

BRIEF DESCRIPTION OF DRAWINGS

FIG. 4 is a front elevational view depicting a second positional relationship between detection point data and an image portion in the present embodiment; and FIG. 5 is a front elevational view depicting a third positional relationship between detection point data and an image portion in the present embodiment.

DESCRIPTION OF EMBODIMENTS

Figure 1:
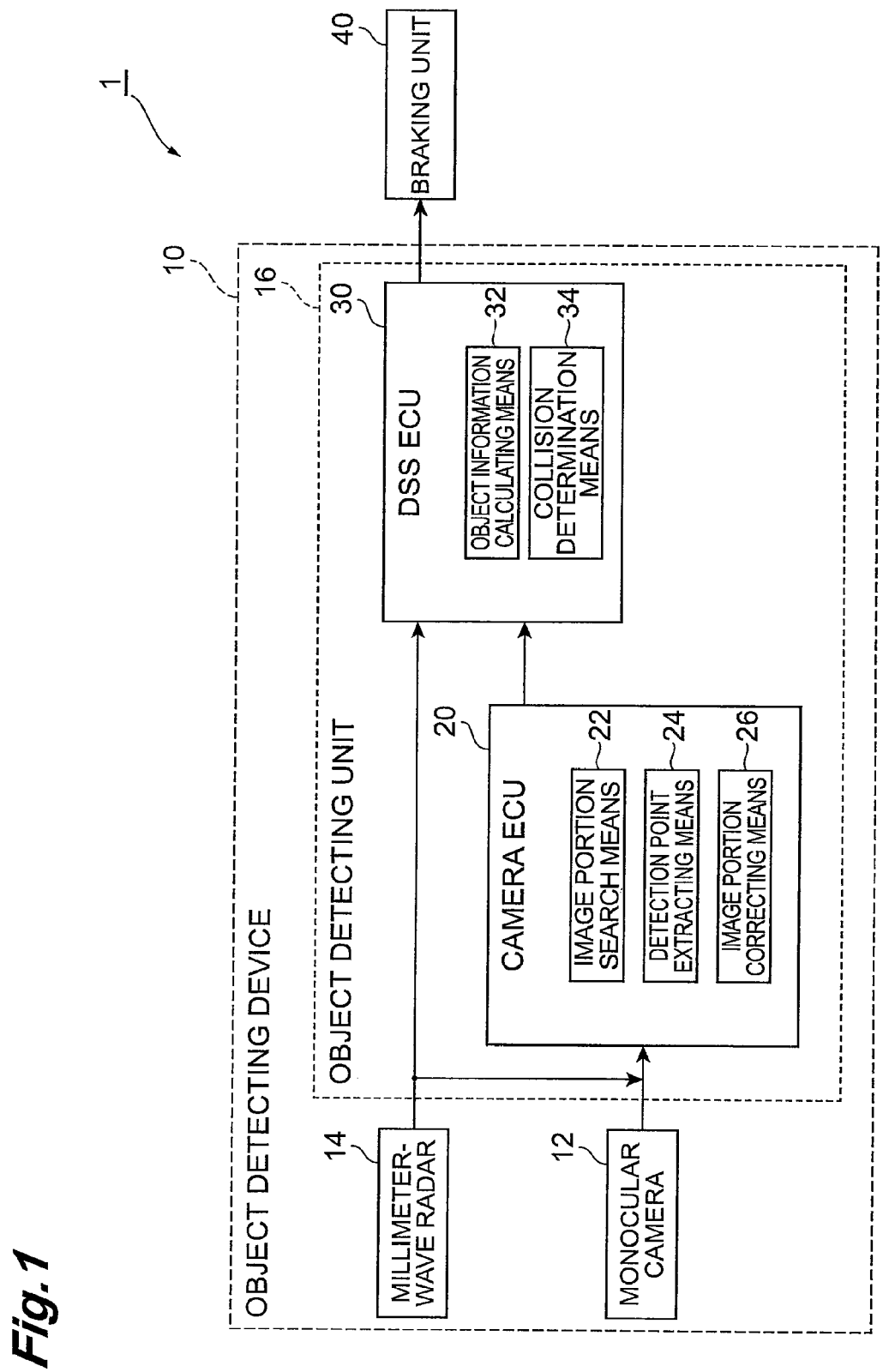
FIG. 1 is a block diagram depicting an object detecting device according to a preferred embodiment of the present invention.

A preferred embodiment of the present invention will be described in detail below, referring to the drawing.

FIG. 1 is a block diagram depicting an anti-collision device 1 according to a preferred embodiment of the present invention. The anti-collision device 1 of the present embodiment, which is a device for preventing collision with an obstacle on the road, comprises an object detecting device 10 and a braking unit 40.

The object detecting device 10, which is a device for detecting a predetermined target object (an obstacle such as another vehicle or a fallen object), comprises a monocular camera 12, a millimeter-wave radar 14, and an object detecting unit 16. The object detecting unit 16 comprises a camera ECU 20 and a DSS (Driver Support System) ECU 30.

The monocular camera 12 is an image capture unit provided at the front of one's own vehicle to capture images ahead of the vehicle. The monocular camera 12 captures images at predetermined time intervals within a predetermined range ahead of the vehicle to generate image data, and sequentially outputs the generated image data to the camera ECU 20.

The millimeter-wave radar 14 is a radar detecting unit attached nearby the monocular camera 12 at the front of the vehicle to detect a an object ahead of the vehicle. The millimeter-wave radar 14 horizontally and vertically scans, with a radio wave in a millimeter-wave zone, a range identical to the predetermined range ahead of the vehicle which is image-captured by the monocular camera 12 and acquires detection point data including data of the distance to an object existing in the range by detecting a wave reflected therefrom. That is to say, the millimeter-wave radar 14 irradiates an object with a radio wave in a millimeter-wave zone in a plurality of different directions within a predetermined range, and acquires, for each of the irradiation directions of the radio wave, detection point data including data of the distance to an object existing in the direction. The millimeter-wave radar 14 acquires detection point data at predetermined time intervals and sequentially outputs the acquired detection point data to the camera ECU 20 and the DSS ECU 30.

The object detecting unit 16 is mounted on the vehicle to detect a predetermined target object based on image data and detection point data and determine the possibility that the vehicle collides with the target object. The processing in the object detecting unit 16 is performed by the camera ECU 20 and the DSS ECU 30.

The camera ECU 20 is an image processing unit which detects an image portion of the predetermined target object from the image data. The camera ECU 20 is connected to the monocular camera 12 and acquires image data output from the monocular camera 12. By processing the image data, the camera ECU 20 detects the image portion of an target object existing ahead of the vehicle. The camera ECU 20 may employ a variety of known image processing techniques for detecting an image portion of the predetermined target object.

In the present embodiment, the camera ECU 20 is connected to the millimeter-wave radar 14 and acquires a large amount of detection point data output from the millimeter-wave radar 14. The camera ECU 20 extracts detection point data corresponding to the target object from the large amount of detection point data acquired from the millimeter-wave radar 14, and corrects the position of the image portion of the target object, referring to the extracted detection point data. Having corrected the position of the image portion of the target object, the camera ECU 20 outputs the image data including the corrected image portion of the target object to the DSS ECU 30.

The DSS ECU 30 is a sensor fusion processing unit which calculates information such as the position and width of the target object, based on the detection point data and the image data. The DSS ECU 30, which is connected to the millimeter-wave radar 14 and the camera ECU 20, acquires the detection point data output from the millimeter-wave radar 14 and also acquires the data of the corrected image portion output by the camera ECU 20. The DSS ECU 30 calculates the amount of characteristic information such as the position and width of the predetermined target object existing ahead of the vehicle, by processing the detection point data and the data of the corrected image portion. The DSS ECU 30 then determines the possibility that the vehicle collides with the target object based on the calculation result and outputs the result of determination to the braking unit 40.

Although the detection point data processed in the DSS ECU 30 is directly sent to the DSS ECU 30 from the millimeter-wave radar 14, the image data processed in the DSS ECU 30 reaches the DSS ECU 30 after having been output from the monocular camera 12 and subsequently having been image-processed in the camera ECU 20. Therefore, in comparison with the detection point data and the image data, which are simultaneously processed in the DSS ECU 30, the image data is time-delayed from the detection point data. In the present embodiment, however, displacement of the object position due to time delay is reduced because the position of the image portion of the target object is corrected in the camera ECU 20.

As shown in FIG. 1, the camera ECU 20 comprises an image portion search means 22, a detection point extracting means 24, and an image portion correcting means 26, and the DSS ECU 30 comprises an object information calculating means 32 and a collision determination means 34. Each of the means shows a part of the processing of the object detecting unit 16 as a configuration of the object detecting unit 16. The means will be described in the explanation of the operation of the object detecting unit 16 described below. The camera ECU 20 and the DSS ECU 30 are mainly based on a computer including a CPU, a ROM, and a RAM, for example.

The braking unit 40 performs braking control which provides the vehicle with braking force by controlling a brake (not shown). In other words, the braking unit 40 acquires from the DSS ECU 30 the determination result of the possibility of colliding with the target object, and if it is determined that there is a possibility of collision, the unit provides the vehicle with braking force by controlling the brake and prevents the vehicle from contacting with the target object.

Figure 2:
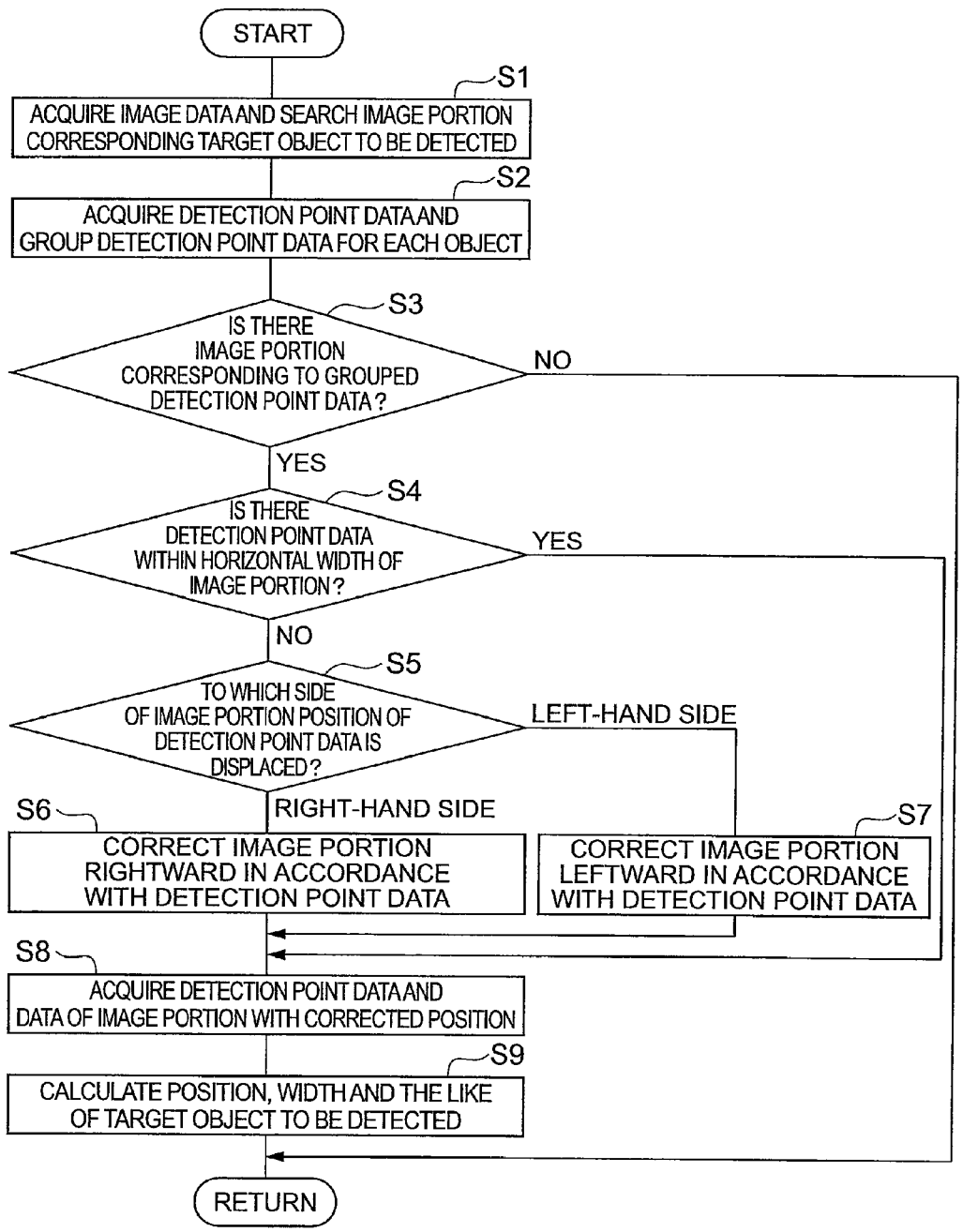
FIG. 2 is a flowchart showing a processing of the object detecting device in the present embodiment.

Next, the operation of the anti-collision device 1 will be described, referring to FIG. 2. FIG. 2 is a flowchart illustrating the processing of the object detecting unit 16, that is to say, the camera ECU 20 and the DSS ECU 30. The following processing is performed repeatedly from start-up to shutdown of the engine. In the following description, a situation will be described as an example where another vehicle is running in the opposite direction ahead of one's own vehicle equipped with the object detecting device 10.

First, at step S1, the camera ECU 20 acquires the image data output from the monocular camera 12 and searches an image portion of the predetermined target object (an obstacle such as another vehicle or a fallen object) from the acquired image data. The camera ECU 20 may employ a variety of known image processing techniques for detecting an image portion corresponding to the predetermined target object. In a situation where another vehicle is running ahead of the vehicle, for example, the camera ECU 20 acquires the captured image data G of another vehicle from the monocular camera 12 and searches an image portion 50 of another vehicle (see FIGS. 3, 4 (*a*), and 5 (*a*)). Here, step S1 corresponds to the image portion search means 22.

Next, at step S2, the camera ECU 20 acquires a large amount of detection point data output from the millimeter-wave radar 14 and groups the large amount of detection point data for each object. For example, the camera ECU 20 groups a plurality of detection point data, which are acquired in the scanning range of the millimeter-wave radar 14 ahead of the vehicle and have mutually close values of irradiation directions and distance data, as detection point data corresponding to a single object. Here, each of the detection point data is composed of data of the irradiation directions of the radio wave in a millimeter-wave zone and data of the distance to the object. The camera ECU 20 performs coordinate transformation from the coordinate system of the millimeter-wave radar 14 to the coordinate system of the monocular camera 12, for each of the grouped detection point data, and calculates, for each of the detection point data, a corresponding position p in the image data G (see FIGS. 3, 4 (*a*), and 5 (*a*)).

Next, at step S3, the camera ECU 20 determines whether each detection point data grouped at step S2 corresponds to the image portion of the target object searched at step S1. If the grouped detection point data and the image portion of the target object exist in an overlapping position in the image data, the camera ECU 20 determines that the grouped detection point data corresponds to the target object and proceeds to step S4. On the other hand, the camera ECU 20 terminates the processing if none of the grouped detection point data corresponds to the image portion of the target object. Because detection point data corresponding to the target object is extracted by the processing of steps S2 and S3, steps S2 and S3 correspond to the detection point extracting means 24.

Next, at step S4, the camera ECU 20 determines whether the detection point data corresponding to the target object exists within a range of the image portion of the target object. If the detection point data corresponding to the target object exists within the width of the image portion of the target object, the camera ECU 20 proceeds to step S8. If, on the other hand, the detection point data corresponding to the target object does not exist within a range of the width of the image portion of the target object, the camera ECU 20 proceeds to step S5.

Figure 3:
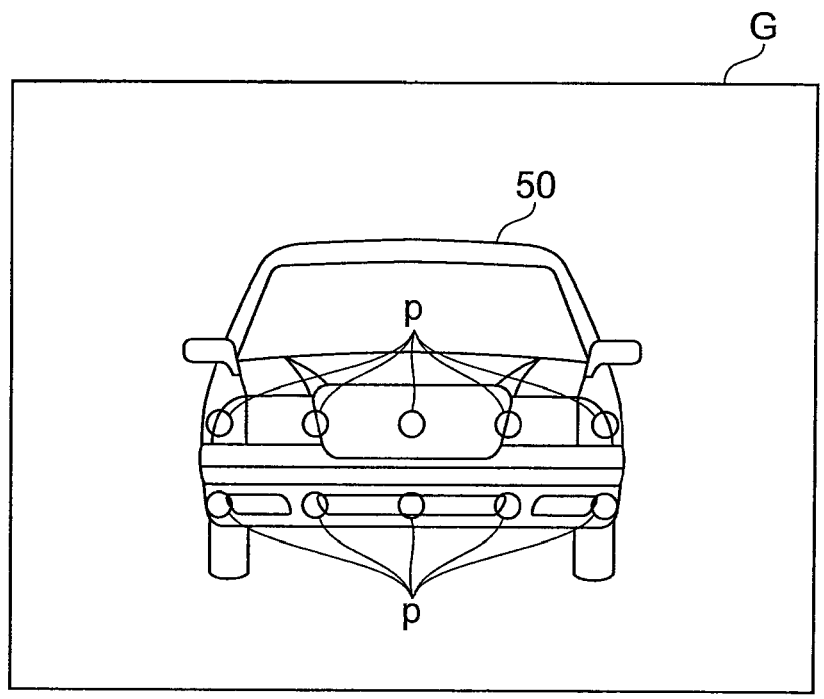
FIG. 3 is a front elevational view depicting a first positional relationship between detection point data and an image portion in the present embodiment.

In a situation shown in FIG. 3, for example, the camera ECU 20 determines that the position of the detection point data p corresponding to another vehicle exists within a range of the width of the image portion 50 of another vehicle, outputs the image data G to the DSS ECU 30 as it is, and proceeds to step S8. On the other hand, in a situation shown in FIG. 4 (*a*) or 5 (*a*) for example, the camera ECU 20 determines that the position of the detection point data p corresponding to another vehicle does not exist in a range of the width of the image portion 50 of another vehicle and proceeds to step S5.

Next, at step S5, the camera ECU 20 determines whether the position of the detection point data corresponding to the target object is displaced to either the right-hand or left-hand side of the image portion of the target object. If the position of the detection point data corresponding to the target object is displaced to the right side of the image portion of the target object, the camera ECU 20 proceeds to step S6. If, on the other hand, the position of the detection point data corresponding to the target object is displaced to the left-hand side of the image portion of the target object, the camera ECU 20 proceeds to step S7.

In a situation shown in FIG. 4 (*a*), for example, the camera ECU 20 determines that detection point data p corresponding to another vehicle is displaced to the right side of the image portion 50 of another vehicle and proceeds to step S6. On the other hand, in a situation shown in FIG. 5 (*a*), for example, the camera ECU 20 determines that the detection point data p corresponding to another vehicle is displaced to the left side of the image portion 50 of another vehicle and proceeds to step S7.

At step S6, the camera ECU 20 corrects the position of the image portion of the target object rightward in accordance with the detection point data corresponding to the target object. More specifically, the camera ECU 20 corrects the position of the image portion of the target object with a high precision by making the right-hand end of the image portion of the target object fit the right-hand end of the region composed of the detection point data corresponding to the target object. The camera ECU 20 outputs the image data including the image portion of the target object whose position has been corrected, to the DSS ECU 30.

At step S7, the camera ECU 20 corrects the position of the image portion of the target object leftward, in accordance with the detection point data corresponding to the target object. More specifically, the camera ECU 20 corrects the position of the image portion of the target object with a high precision by making the left-hand end of the image portion of the target object fit the left-hand end of the region composed of the detection point data corresponding to the target object. The camera ECU 20 outputs the image data including the image portion of the target object whose position has been corrected, to the DSS ECU 30.

In a situation shown in FIG. 4 (a), for example, the camera ECU 20 acquires image data H shown in FIG. 4 (b) by making the right-hand end of the image portion 50 of another vehicle fit the right-hand end of the region composed of the detection point data p corresponding to another vehicle. Additionally, in a situation shown in FIG. 5 (a), for example, the camera ECU 20 acquires image data H shown in FIG. 5 (b) by making the left-hand end of the image portion 50 of another vehicle fit the left-hand end of the region composed of the detection point data p corresponding to another vehicle. Steps S4 to S6 correspond to the image portion correcting means 26.

With the above-mentioned processing of the present embodiment, positional displacement of the image portion of the target object due to the time required for image processing has been eliminated or reduced. In other words, after having acquired the image data from the monocular camera 12 and performed image processing thereon, the camera ECU 20 acquires the detection point data from the millimeter-wave radar 14. The camera ECU 20 then corrects the position of the image portion of the target object searched from the image data in accordance with the detection point data corresponding to the target object. According to this processing, the positional displacement of the image portion of the target object has been eliminated or reduced because the position of the image portion of the target object is corrected using temporally newer detection point data and thus, the improvement of detection precision of the target object is realized.

Next, the process flow proceeds to the processing by the DSS ECU 30. At step S8, the DSS ECU 30 acquires the detection point data from the millimeter-wave radar 14 and also acquires the image data from the camera ECU 20. Here, the detection point data acquired by the DSS ECU 30 has been generated either at the same time as or at a time very close to when the detection point data used in the previously mentioned processing of the camera ECU 20 was generated. Therefore, the positional displacement of the image portion of the target object has been eliminated or reduced, also for the detection point data acquired by the DSS ECU 30.

Next, at step S9, the DSS ECU 30 calculates information relating to the target object, based on the detection point data and the image data. In other words, the DSS ECU 30 calculates information such as the position and width of the target object from the direction data and the distance data included in the detection point data corresponding to the target object, and from the corrected image portion of the target object. Further, Steps S7 and S8 correspond to the object information calculating means 32.

Based on the position and width of the target object calculated by the above-mentioned processing, the DSS ECU 30 determines the possibility that the vehicle collides with the target object and outputs the determination result to the braking region 40. This processing corresponds to the collision determination means 34.

The braking unit 40 acquires from the DSS ECU 30 the result of determination of the possibility that the vehicle collides with the target object. If a determination result is acquired indicating that the vehicle and the target object may possibly collide, the braking unit 40 then provides the vehicle with braking force by controlling the brake and prevents the vehicle from contacting with the target object.

In the present embodiment, since the DSS ECU 30 calculates information such as position and width relating to the target object, based on the image data H with corrected position of the image portion of the target object, precision of detecting the target object can be improved. In addition, since the DSS ECU 30 precisely determines the possibility that the vehicle collides with the target object, based on information of the target object whose detection precision has improved, erroneous determination of possible collision can be prevented and thus, situations where a necessary control is not performed or an unnecessary control is performed can be avoided.

Although a preferred embodiment of the present invention has been described in detail above, the object detecting device of the present invention is not limited to the above-mentioned embodiment. Although the embodiment exemplified a case of detecting another vehicle, a target object other than another vehicle may be detected in other embodiments.

Additionally, in the above-mentioned embodiment, although the camera ECU 20 makes the end of the image portion of the target object fit the end of the region composed of detection point data corresponding to the target object when the detection point data corresponding to the target object is displaced from the image portion of the target object, the present invention is not limited thereto. The camera ECU 20 may move the image portion of the target object so that the detection point data which has been displaced from the image portion of the target object is included within the range of the image portion of the target object.

Additionally, in the above-mentioned embodiment, although the camera ECU 20 corrects the position of the image portion corresponding to the target object horizontally, the position of the image portion corresponding to the target object may be corrected vertically. In addition, the camera ECU 20 may correct the position of the image portion corresponding to the target object both vertically and horizontally.

Additionally, although the present embodiment is configured such that the camera ECU 20 has the detection point extracting means 24 and the image portion correcting means 26, other embodiments are configured such that the DSS ECU 30, in place of the camera ECU 20, has the detection point extracting means 24 and the image portion correcting means 26.

In addition, although the millimeter-wave radar 14 is used as the radar detecting unit in the present embodiment, the radar detecting unit may irradiate an object with an electromagnetic wave having other wavelengths, and a laser radar may be used as the radar detecting unit, for example.

INDUSTRIAL APPLICABILITY

According to then object detecting device of the present invention, displacement of the position of the object recognized by image processing is reduced and thus, the precision of object detection can be improved.

REFERENCE SIGNS LIST

1: anti-collision device, 10: object detecting device, 12: monocular camera (image capture unit), 14: millimeter-wave radar (radar detecting unit), 16: object detecting unit, 20: camera ECU, 22: image portion search means, 24: detection point extracting means, 26: image portion correcting means, 30: DSS ECU, 32: object information calculating means, 34: collision determination means, 50: image portion, H: image data, p: detection point data.

The invention claimed is:

1. An object detecting device comprising:
   an image capture unit configured to capture images within a predetermined range and acquires image data;
   a radar detecting unit configured to irradiate an object with electromagnetic waves in a plurality of different directions within the predetermined range and acquires, for each of the irradiation directions of the electromagnetic waves, detection point data including data of the distance to an object existing in the direction; and
   an object detecting unit configured to detect a predetermined target object to be detected, based on the image data captured by the image capture unit and the detection point data detected by the radar detecting unit, wherein the object detecting unit comprises:
   an image portion search device configured to search the image data captured by the image capture unit, referring to the detection point data detected by the radar detecting unit, and detect an image portion corresponding to the target object to be detected;
   a detection point extracting device configured to extract, from the detection point data detected by the radar detecting unit, detection point data corresponding to the target object to be detected after the image portion search device has detected an image corresponding to the target object to be detected; and
   an image portion correcting device configured to correct, in accordance with the detection point data extracted by the detection point extracting device, the position of the image portion detected by the image portion search device.

2. The object detecting device according to claim 1, wherein the image portion correcting device corrects the position of the image portion so that an edge of the image portion corresponding to the target object fits an edge of the region comprising the detection point data extracted by the detection point extracting device.

3. The object detecting device according to claim 1, wherein the image portion correcting device corrects the position of the image portion when the detection point data extracted by the detection point extracting device exists outside the image portion.

4. The object detecting device according to claim 1, wherein the object detecting unit further comprises an object information calculating device which calculates information relating to the target object to be detected, from the detection point data extracted by the detection point extracting device and the image portion whose position has been corrected by the image portion correcting device.

5. The object detecting device according to claim 1, wherein the target object to be detected is a vehicle.

* * * * *

UNITED STATES PATENT AND TRADEMARK OFFICE
CERTIFICATE OF CORRECTION

PATENT NO.        : 8,466,827 B2
APPLICATION NO. : 12/988941
DATED             : June 18, 2013
INVENTOR(S)       : Takeshi Nanami It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 141 days.

Signed and Sealed this

Eighth Day of September, 2015

Michelle K. Lee
*Director of the United States Patent and Trademark Office*